Sept. 29, 1964          D. T. BARISH          3,150,850
AERIAL-RECOVERY VEHICLES OR SYSTEMS
Filed April 11, 1961          3 Sheets-Sheet 1
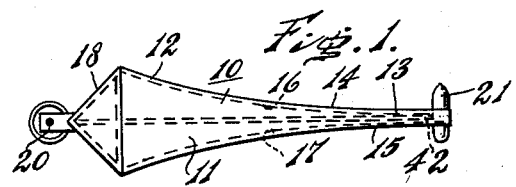
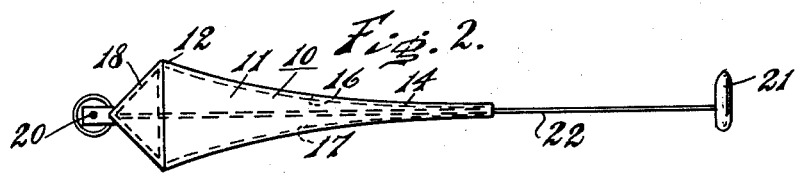
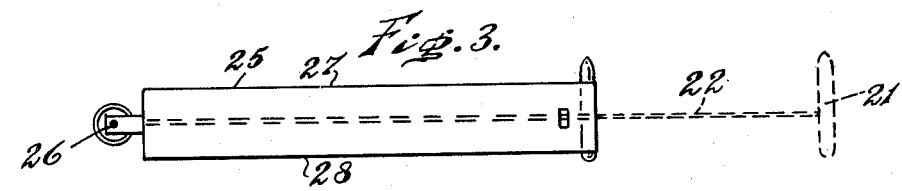
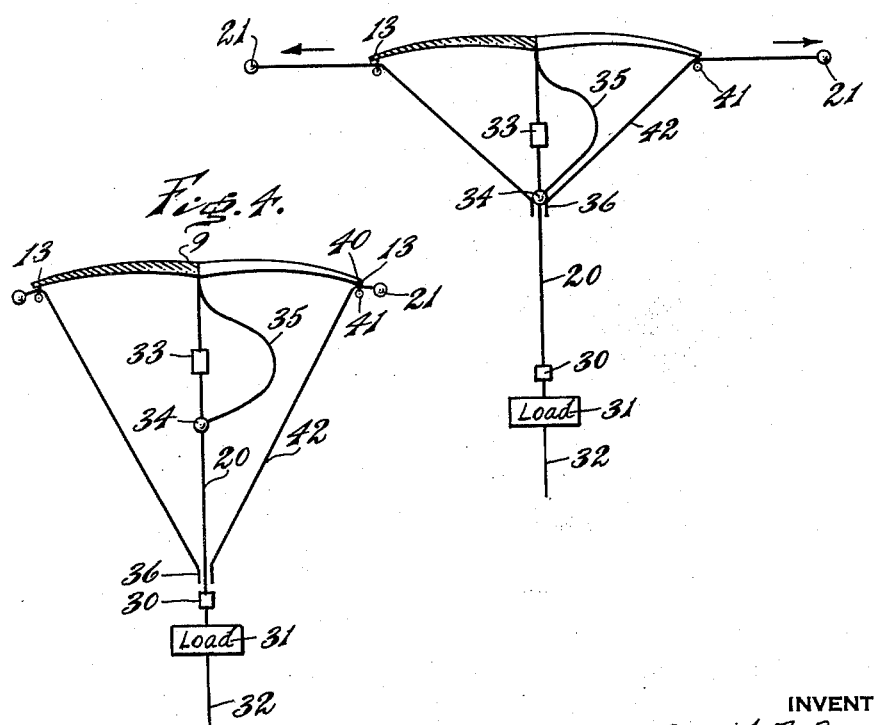
INVENTOR,
David T. Barish
BY
Frank H. Borden
ATTORNEY

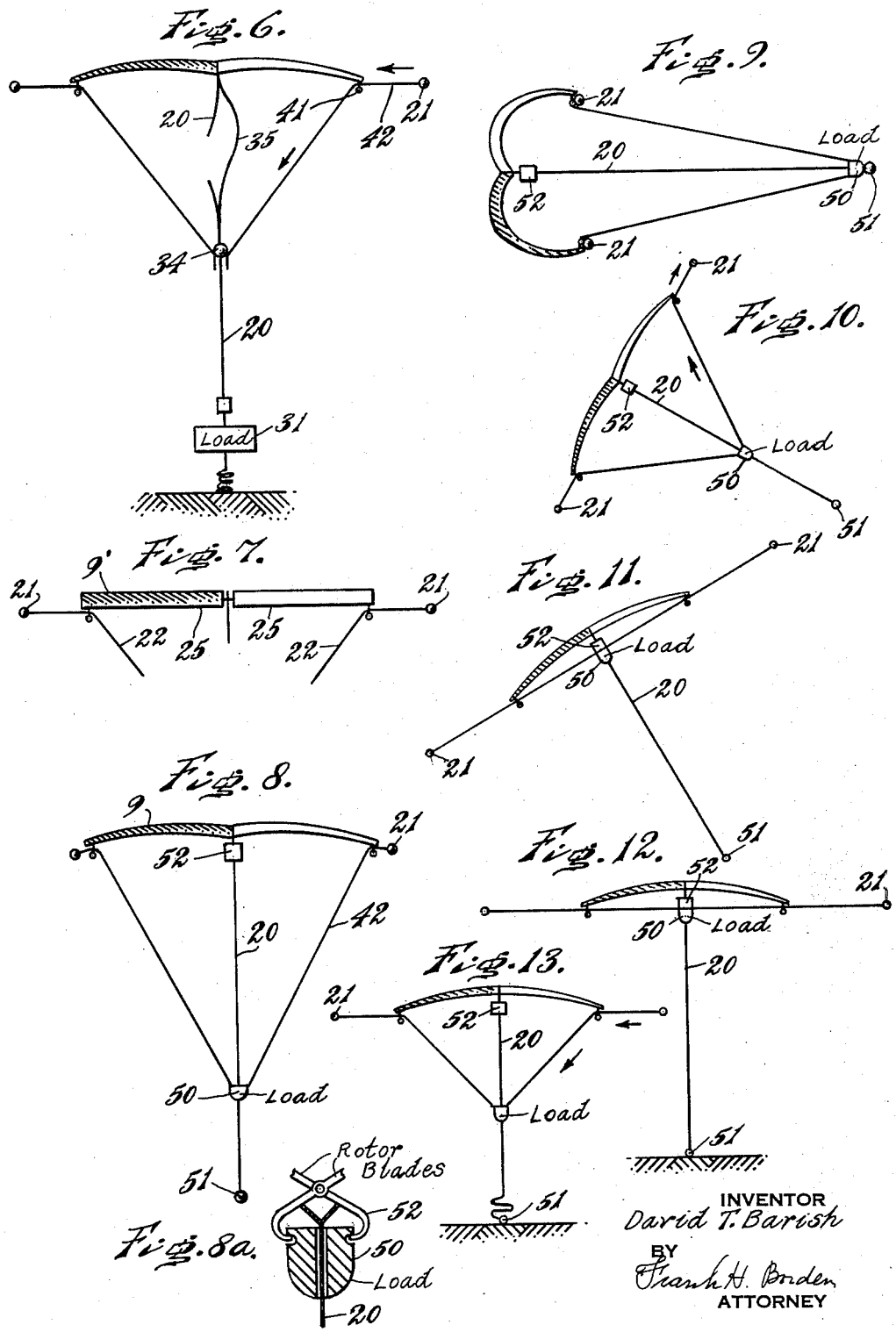

Sept. 29, 1964     D. T. BARISH     3,150,850
AERIAL-RECOVERY VEHICLES OR SYSTEMS
Filed April 11, 1961                    3 Sheets-Sheet 3
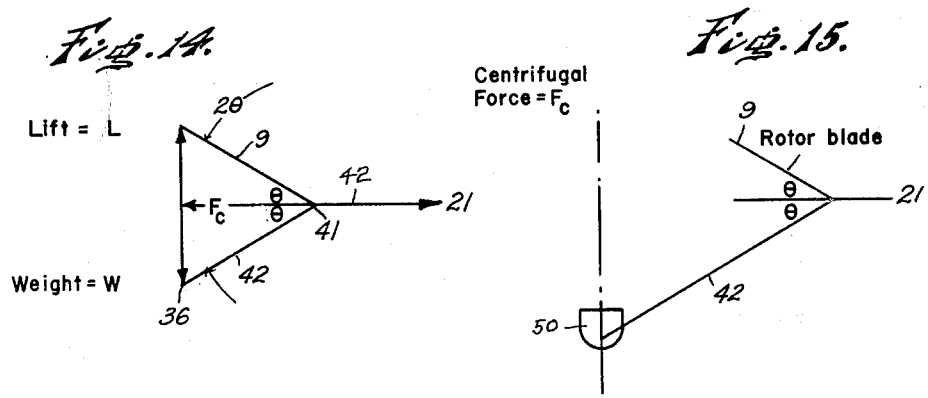
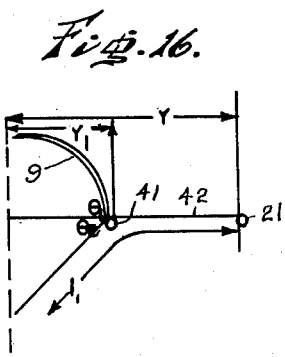
INVENTOR
David T. Barish
BY
Frank H. Borden
ATTORNEY

United States Patent Office 3,150,850
Patented Sept. 29, 1964

3,150,850
AERIAL-RECOVERY VEHICLES OR SYSTEMS
David T. Barish, New York, N.Y., assignor, by direct and mesne assignments, to Barish Associates, Inc., New York, N.Y., a corporation of New York
Filed Apr. 11, 1961, Ser. No. 102,277
9 Claims. (Cl. 244—138)

This invention relates to aerial-recovery vehicles or systems.

Such systems, for the safe recovery of missile cones, or other portions of the missile, are complicated by the fact that at some portion of their trajectory they are substantially out of the earth's atmospheric belt, they then enter such belt, and finally land on the earth. It is often necessary, for the preservation of the cone, or other stage of the missile, that the entry into the atmospheric belt be accomplished without unassimilable decelerations, and that the approach to the ground be so organized that just before impact the drag of the recovery device is enhanced so that the actual landing is at such a minimized rate of descent as to preserve the integrity of the missile part being recovered. This is designated generally as "flare-out."

It is appreciated that, in general, missile recovery systems, or vehicles, frequently may incorporate some form of rotor system. This may take any of the well known forms. In specific detail reference may be made to the rotor disclosed in applicant's U.S. application Serial #12,011, now Patent No. 3,117,630, entitled Rotors. Any other type of autorotating device may be used in connection with the present invention, including, but not limited to, so called "rigid" or "semi-rigid" rotors.

It is among the objects of this invention: to provide a recovery vehicle or system in which the lift of the system is enhanced adjacent to the ground to reduce the impact velocity of the load on touch down; to provide a rotational system of efficacy in recovery systems with means for storing rotational energy during part of the descent and which is restored to the rotational system adjacent to the ground for increased rotational speed and hence increased lift therefrom; to provide a rotor system having blades, with tip weights disposed or stowed adjacent the blade tips during initiation of autorotation, with suspension line means mounting the weights which are extensible radially outward in the general plane of autorotation to positions of appreciable spacing from the respective blade tips, in which the blades drive the weights increasing the kinetic energy of rotation, with means for retracting the weights toward the rotor axis as the load approaches the ground, and utilizing the stored excess of energy for driving the rotor blades at higher speeds producing the extra lift necessary for the flare-out; to provide a recovery system which obviates or minimizes the extra mechanical energy required to perform the "flare-out"; to provide a recovery system utilizing a rotor having effectively two different radii whereby kinetic energy of rotation can be stored during the operation of the rotor of larger radius and utilized to increase the rotational speed of the rotor of smaller radius; to provide a recovery system comprising a rotor of varying effective radii by which substantially 90% of the energy of rotation developed in the rotor of larger radius is utilized in increased lift in the rotor of smaller radius; to provide a rotor, of a fixed lifting surface, tip radius, tip speed, or disc loading with tip weights outboard of the tips of the lifting surface, with means placing the tip weights further outboard to reduce the weight needed to produce a given centrifugal force; to provide a rotor system with tip weights on extensible lines with means for retracting the tip weights to drive the rotor when desired; to provide a rotor system comprising rotor blades, tip weights and suspension lines attached to the tip weights, with means of extending the tip weights by sliding the apex of the suspension lines upwardly on a center line from the rotor system; to extend the just mentioned object to comprehend a releasable means for holding the apex of the suspension lines at a predetermined point on the center line; to provide a rotor system with tip weights susceptible to radial extension and retraction with means for effecting the retraction; to provide ground or water sensor means to sense the proximity of the system to landing areas, with means automatically operative to retract previously extended tip weights to increase the rotational speed of a rotor system mounting tip weights to effect satisfactory flare-out: and many other objects and advantages will become more apparent as the description proceeds.

In the accompanying drawings, forming part of this description:

FIG. 1 represents a schematic plan of a rotor blade of an illustrative rotor system, as disclosed generally in the noted pending U.S. application of David T. Barish, Serial #12,011, filed March 1, 1960, as modified to accommodate the present invention, by having the tip weights of said application, extensible on retractable cord or suspension like lines.

FIG. 2 represents a similar schematic plan of the rotor blade of FIG. 1, with the tip weights radially extended for purposes of this invention.

FIG. 3 represents schematically a plan of a rotor blade of the rigid or semi-rigid type, mounting the movable tip weight in partially fully lines, and showing in dotted lines, the extension of the tip weight on a suspension like line.

FIG. 4 represents schematically a side elevation of one form of the vehicle system of the invention in which the axial effective extension of the initial center line of the rotor system causes the load to retract the weights on the suspension lines, when desired, in which the tip weights are stowed adjacent the tips of the blades of the rotor system.

FIG. 5 represents a similar schematic elevation in which the tip weights have been radially deployed and the apex of the suspension lines thereof has moved axially upward against a stop on the initial center line of the system.

FIG. 6 represents a similar elevation in which the rupture of a taut portion of the initial center line has caused the load to downwardly retract the apex of the suspension lines to radially retract the tip weights.

FIG. 7 represents a fragmentary schematic elevation of the rigid or semi-rigid rotor of FIG. 3, with the tip weights retracted and mounted at or adjacent to the tips of the respective blades.

FIG. 8 represents a schematic side elevation of a rotor system, according to a modified form of the invention, in which the suspension lines are directly coupled to the load, and the latter is movable vertically along a center line toward a latching component beneath the rotor, as an illustrative different means for retracting the tip weights, from that of the earlier figures.

FIG. 8a represents a fragmentary section of the connection between the blades and the load for quick release, in an illustrative organization.

FIGS. 9 through 13 represent successive diagrammatic illustrations of the rotor system according to the illustrative FIG. 8, in its several stages from the initial deployment prior to rotation, through the start of rotation and the deployment of the tip weights, through full extension of the tip weights, with latching of the load beneath the canopy of the rotor, through initial ground contact, with the weights fully deployed, through unlatching of the load from the latching device as ground contact is established, with utilization of the potential energy stored in the load for retracting the tip weights and increasing the rotational speed of the rotor system, for establishing a satisfactory "flare-out" landing.

FIGS. 14, 15 and 16 represent diagrams of the forces during operation.

The basic part of the recovery system or vehicle is some sort of rotor system that either "windmills" or goes into autorotation following deployment. A purely illustrative rotor which is useable in the system, as noted, is disclosed in U.S. application to Barish, Serial #12,011, filed March 1, 1960, entitled "Rotors." This is preferred for use in this connection because among other advantages it incorporates flexible blades which can be rolled upon themselves for stowage, and also incorporates tip means, which, under rotation exert spanwise tension on the blades, and maintain the shaping of the blades both in chordwise and spanwise camber. While for certain purposes the tip means are aerodynamic, in the preferred form they are tip weights which exert the spanwise tension by centrifugal force of the rotor. While the utilization of specific tip means in the present invention may depend upon the altitude at which the rotor is deployed, as the aerodynamic means requires atmosphere for proper reaction, weights are preferred as responsive to centrifugal force alone. It will be understood however that the benefits of the instant invention attach to any form of rotational device capable of autorotation or windmilling, including rigid and semi-rigid rotors, and the like, provided that the lift of the device can be increased functionally with input of power thereto.

As will be explained it is a feature of this invention to utilize the potential energy of the load as part of the means for input of power into the rotor system.

Referring to FIG. 1, there is illustrated a diagrammatic plan of a blade of a rotor as disclosed in said application, for purely illustrative purposes. In this case the blade 10 is comprised of a tapered flexible membrane having the wider section thereof at or toward the root, as at 12, and a narrower end thereof at the tip, as at 13. The root and tip are connected at the edges of the panel or blade by concave surfaces or edges, each preferably comprising substantially hyperbolic curves, respectively 14 and 15. Each has a binding, or tension member, at the respective curved edges, as at 16 and 17, indicated in dotted lines in FIG. 1. The tension members 16 and 17 at the inboard, root end, of the blade are respectively connected to the corners of an illustratively, generally triangular blade mounting member 18, suitably connected to a hub or center line 20. The outer extremities of the tension members 16 and 17 at the outboard, tip, end of the blade 13 are connected to a tip weight 21. In deployment and rotation the tip weight 21 exerts spanwise tension on the blade 10 and together with the tension members 16 and 17 causes the flexible blade to establish and maintain proper shaping of the blade, in both chordwise and spanwise camber. It will be understood that the illustrated blade 10, in the preferred rotor system, is one of a plurality of similar blades, disposed to rotate about the center line 20, as an axis and forming a generic rotor 9. It will be understood that if desired the center line 20 might be a rigid rod functioning as an axle or hub of the rotor, if the weight requirements permit.

In FIG. 2 the blade of FIG. 1 has been provided with means rendering the tip weight 21, extensible substantially radially of the blade 10, by means of a suspension like line 22, to be described. It will be observed that the radius of the rotor formed by plural blades 10 of FIG. 1, is much smaller than the effective radius of the rotor formed by the extension of the tip weights as in FIG. 2.

FIG. 3 represents a diagrammatic plan of a so-called rigid rotor blade, which may be used in pluralities, as disclosed diagrammatically in FIG. 7, to form a useable, but not the preferred, rotor of the system. In this figure the rigid blade 25 is suitably connected to the hub or center line 26, and is of airfoil shape, having a leading edge 27 and a trailing edge 28, as is conventional in certain helicopters and autogyros. In assembly the plural blades form a generic rotor 9', schematically indicated in FIG. 7.

Whatever the rotor system, the means for deploying and retracting the tip weights, to change the effective diameter of the rotor, or the radius of the blades, may be of any sort comporting with the principles of the invention. Purely for sake of illustration, two different organizations are disclosed herein, among others that may be used, as respectively illustrated in FIGS. 4 to 6 inclusive, and in FIGS. 8 to 13, inclusive.

Referring to FIGS. 4 to 6 inclusive, the initial center line or axis 20, of the rotor 9, preferably mounts a swivel 30, in case it is desired to prevent rotation of the load with the rotor and beneath the swivel is mounted the load 31. In the usual case a ground senser line or device 32 is suspended beneath the load 31. A cord severing device 33 is connected to the center line 20. While this may be a mechanical severing device, such as a bladed implement, it may be preferred that it be pyrotechnic, fired in well known ways by contact with the ground or water by ground-sensor 32. The sensor may function, by relief of weight, or by containing circuit wires closing a circuit when immersed in water.

The center-line severing device may comprise a pyrotechnic element, rendered operable by motion of slider 36 (to be described) and triggered by means operated by ground sensor element 32, as is common in the art.

Additionally the center line 20, axially, below the cord-severing device 33, mounts a stop element 34. From the top of the stop element 34, or from the center line 20 thereabove, a secondary or supplemental or extension center line 35 connects to the apex of the rotor 9 or 9', at the junction thereof with center line 20, in slack or looped form. A slider 36, of cylindrical form, preferably, surrounds the center line 20, below the stop 34, and anchors the inner ends of the suspension-like lines, to be described, at their apex. Preferably, during deployment of the rotor, the slider 36 is connected to the load, subject to release upon attainment of proper rotational speed of the rotor, by any desired means.

Each blade of the rotor, beneath the tip ends thereof, at 13 mounts a chordwise member 40, connected to the outer ends of the tension members, which carries a pulley or line guide slider 41, over which a suspension line 42 passes between the axial slider 36, surrounding the center line 20, and a tip weight 21. With the axial slider at its lower position, and preferably detachably engaged by the load, the tip weights 21 are pulled in tightly, adjacent to the tips of the respective blades. In this position they serve the same function as the tip weights in said application, in developing spanwise tension on the blades.

In the initial deployment and after rotation begins, the axial slider 36 is disconnected from the load and rises along the center line 20 as, under centrifugal force, the weights 21 move outwardly generally radially of the axis of the center line, as payed out by the motion of the suspension lines across the guide slider or pulley 41. This paying out function stops when the axial slider 36 abuts the stop 34 on the center line 20.

It will be seen that at this stage the center line 20 is taut, whereas the supplemental line 35 is slack, and the load has a given space relationship to the apex of the rotor 9. It will be evident that the load has a certain potential energy stored in it by this taut relationship.

When the ground or water is contacted by the sensor 32, or upon the actuation of any other signal, controlling the device, the cord-severing device 33 is triggered or operated, as indicated in FIG. 6, causing the supplemental cord 35, in conjunction with the portion of center line 20, below the stop 34, to become the taut line, dropping the stop 34 and load 31, and by pressure from the stop 34 moving the axial apex of the suspension lines at slider 36 downwardly, and utilizing the potential energy of the load to retract suspension lines 42, to pull in the weights 21.

The various functions attaching to the various stages of the preceding description will be considered after describing the illustrative form of the invention shown in FIGS. 8 to 13 inclusive.

Referring to FIG. 8, the rotor assembly, in large part, is that disclosed in connection with the preceding discussion, as a duplication thereof, and where like parts are incorporated similar numbers are used. Thus, the rotor 9 has a center line 20, passing through a combined swivel and load 50, to a combined sensing and bob weight element 51. The center line adjacent the canopy of the rotor mounts a latching element 52, which may incorporate a ratchet and pawl organization, part of which is on the center line element 52, and the other part of which is on the load or swivel. This is for the purpose of temporarily latching the combined swivel and load to the upper end of the center line during rotation of the rotor with the tip weights fully deployed. In this case the bob weight 51 is to maintain the tautness of the center line while permitting axial travel thereon of the combined swivel and load. The suspension lines 42, at their inner apex, are connected to the swivel portion of the combined swivel and load 50, which have suitable anti-friction means to permit the rotation of the rotor and suspension lines, while permitting the load to be subjected to minimal torque.

FIGS. 9 to 13 represent successive stages of progress of the device of FIG. 8, and in attitude and performance are basically similar to that attaching to the form of the invention shown in FIGS. 4 to 6 inclusive. Except for limitations of the drawing sheet these figures may be incorporated in a continuous trajectory path. FIG. 9 represents the initial attachment of the rotor to the load in free flight, prior to deployment, in which the load has its highest, possibly substantially horizontal, high velocity flight. FIG. 10 represents the initial deployment and start of rotation in which the center line begins to assume an angle to the horizontal and the tip weights 21 have started to move radially outwardly and the load 50 has started to move axially upwardly along the center line 20. FIG. 11 represents the stage in which the center line has been canted downwardly toward the vertical, the weights are fully deployed and the load has engaged and been latched by the latching component 50. FIG. 12 represents the next stage, when with weights fully deployed, the center line has assumed the practically vertical, with the load still latched to the upper end of the center line. Finally, FIG. 13, represents the position of the parts adjacent to the landing area, when the flare-out has started, in which the latching device 52 has unlatched the load and the latter has started to move axially downwardly along the center line, and the weights have started to be retracted with retraction of the suspension lines.

It will be seen that there is a fundamental factor in both disclosed forms of the invention, in that, in one case the slider 36 moves freely up the center line to engage stop 34, and is moved downwardly by the potential energy of the load, and in the other case the slider is the load, which moves downwardly by accumulated potential energy, as will be explained.

An important functioning of the device is the cushioning of the shock loads. Since most of the lift on the load is derived from the rotation of the blades, any retardant to this rotation lowers the opening shock force, and the excess kinetic energy of the load, due to its high speed, is converted into the kinetic energy of the tip weights, for later use. In other words the blades are initially deployed. There is an aerodynamic torque tendency to force them into autorotation. If this is allowed to prevail before the load slows down a very high decelerative force results. However, if the torque is used to drive the tip weights, the rotational speed of the rotor is reduced and a lower shock force results. Furthermore, the use of the tip weights outboard of the tip of the lifting surface reduces the weight needed to produce a given centrifugal force.

It is pointed out that as the outwardly deployed tip weights are driven by the blades, they pick up centrifugal force and rotational energy. This enhanced centrifugal force tends to flatten the blades to produce higher aerodynamic efficiency, a larger tip radius and a lower steady rate of descent. The tip weight extension also lowers the solidity of the rotor producing higher rotational speeds.

Mention has been made that the cord severing device 33, and the latching organization for the slidable apex 36 could be of any desired sort capable of achieving the functions. For purely illustrative instance devices filling these requirements may be found in WADC TR 55–265, dated December 1956, USAF Parachute Handbook, in the section dealing with release mechanism and cargo release.

In operation the system performs as follows: during the initial deployment of the rotor, (FIG. 9), the load is traveling at relatively high speed. In order to slow the load down sufficient drag must be created to overcome, not only the weight of the load, but the inertial forces acting upon it. As a result the rotor, in order to produce the excess drag must overspeed. If the load is free to travel along the center line, actually, in FIGS. 8 to 13, and effectively, in FIGS. 4 to 6, the excess centrifugal force acting on the tip weights will convert some of the excess kinetic energy of the load into increased kinetic energy of the weights (by slinging them further out), and some into increased potential energy of the load, (by raising it along the center line).

All of that just described takes place before the system reaches an equilibrium rate of descent in which the lift is equal to the gross weight. Due to the inertia of the load it will overshoot its rise along the center line. When the load reaches its highest position on the center line it is latched or otherwise held therein, whereby it stores this extra potential energy.

To initiate the flare-out, the latch, (or its equivalent) is released abruptly, or the center line is ruptured abruptly. Due to the release from, or by, the center line, there is sufficient excess of force and energy in the load to overcome the centrifugal force on the tip weights and they start inward. Because the tip weights are restrained in rotation by the rotor blades, their kinetic energy goes primarily into driving the blades, producing the lift for flare-out. As the energy of the tips or tip weights is dissipated, they are drawn further inboard by gravity on the weight of the load, until, just prior to touchdown, they are all the way in and their job is completed.

The two systems are related and have similar functions. The only main difference is that in FIG. 4 the potential energy is stored in the load by the short center line, and is converted by the dropping of the load to the end of the longer center line, whereas in FIG. 8, the potential energy is stored in the load by vertical movement of the load relative to the rotor.

Analysis of forces during retraction.

If the slider attached to the suspension lines is allowed to rise without supporting any load as the weights go outboard during deployment, it would continue all the way up the line to a point at which the suspension lines are substantially parallel to the rotor blades. In this position virtually all of the lifting load would be carried by the center line alone. If the center line is cut, while holding the load with the suspension line apex, the lift is still provided by the rotor blades and the apex will drop, attempting to reach a position where the angle $\theta$ between the tipline and the suspension line is equal to the angle between the tip of the rotor and the tip line, as shown in FIGS. 14 and 15. Assuming, for this purpose, that the portion of suspension-like line 42, between the pulley or guide 41 and weight 21 comprises the tipline, and that portion thereof between pulley or guide 41 and the slider 36, comprises the suspension line.

These FIGURES 14 and 15, show the forces acting at the intersection of the suspension lines and the rotor if the drag (lift L) in steady descent is equal to the weight W, and the tensions are equal in the suspension lines and in the lifting rotor.

To assure full flare-out energy being available, the shortening of the tip weight radius (and the lowering of the available centrifugal force) must occur for all values of the suspension line length. Under these conditions For all values $$Fc \leq 2W \tan \theta \qquad (1)$$

For a given value of $\theta$
$l_1$=suspension line length
$r$=tip weight radius
$r_1$=blade radius
$\Omega$=angular velocity $$Fc = \frac{Wr}{g}\Omega^2 r \qquad (2)$$

where $$r = r_1 + l_1 - \sec \theta \qquad (3)$$

Combining (1), (2) and 3

$$\frac{Wr}{g}\Omega^2(r_1 + l_1 - r_1 \sec \theta) \leq 2W \tan \theta$$

See FIG. 16, which is the force diagram for the case where the suspension line is extended to the tip weight 21 so that $l_1$ remains constant. Under this condition (without pulley friction), the tensions in all parts of the line are equal, although angles $\theta_1$ and $\theta_2$ are not equal.

For fixed values of $Wr$, $\Omega g$, $W$, $r_1$ the expression $$\frac{\tan \theta}{1 + \frac{l_1}{r_1} - \sec}$$

must exceed $$\frac{\Omega^2 W r r_1}{2gW}$$

for all values of $\theta$ since $\sec \theta \leq l_1/r_1$ the minimum value of the denominator is 1, and the denominator decreases monotonically while the numerator increases monotonically with $\theta$. Thus, once the weights start inboardly from their extended position, they will continue to move inboardly.

To insure the start of retraction at small angles of $\theta$ $$\frac{Wr\Omega^2 l_1}{g} = Fc \leq 2\theta W$$

since the minimum value of $\theta$ is given (if the line is parallel to the blade) by $$\theta = \frac{Fc}{W}, \quad 2\theta > \frac{Fc}{W}$$

and retraction will always occur when the load is transferred to the suspension lines.

Since certain further changes can be made in the foregoing construction and different embodiments of the invention may be made without departing from the scope thereof, it is intended that all matter shown in the accompanying drawings or described hereinbefore shall be interpreted as illustrative, and not in a limiting sense.

I claim as my invention:

1. A recovery system comprising an autorotational blade system comprising plural blades rotational about a common axis, a weight on each of said respective blades, means for centrifugally moving said respective weights generally radially outward of said blades by centrifugal force incident to normal autorotational speed of said plural blades to store energy of rotation, and means operative during autorotation retracting said weights toward said blades to convert the major part at least of the stored energy into higher than said normal autorotational speed of the blade system.

2. A recovery system comprising a rotor formed of blades having a common substantial axis of rotation and susceptible to autorotation, means operative in flight varying the effective radius of the rotor between a relatively small effective radius a relatively large effective radius and back toward the relatively small effective radius, and gravity operated means controlling the variation of the radius of the rotor back to the relatively small radius, said rotor of small effective radius having a given autorotational speed of rotation, said rotor when of substantially larger radius storing energy of rotation which is converted at least in part into enhanced rotational speed of the rotor as the radius of the latter moves toward its smaller radius.

3. A recovery system for a descending load comprising a rotor having blades and susceptible to autorotation, weights on said blades, line means mounting said weights and movable relative to said blades for paying out said weights substantially radially of said blades under centrifugal force, means moving and paying out said line means as said rotor progresses into autorotation whereby said weights travel arcuately on a predetermined larger radius than that of said blades and store energy of rotation, and means retracting said line means enhanced during flight and moving said weights toward said blades substantially converting said stored energy into enhanced rotational speed of said rotor for flare-out.

4. A recovery system as in claim 3, in which said last means is actuated by potential energy stored in the load supported by said system during descent.

5. A recovery system comprising a rotor having a lifting surface, a weight mounted on said lifting surface, centrifugal means moving the weight outboard of and beyond the lifting surface, and gravity operated means moving the weight inboard of and substantially to said lifting surface.

6. A recovery system comprising a rotor, tip weights on the rotor, suspension lines connecting the tip weights to the rotor and means respectively comprising centrifugal force and gravity operated means varying the effective length of the suspension lines between the tip weights and the rotor.

7. A recovery system for a descending load comprising a rotor having blades having a common center line, said center line constituting the axis of rotation of said rotor tip weight suspension lines having a substantially common apex concentric with and movable axially along said center line, means supporting said suspension lines adjacent to the tips of the respective blades, weights on said suspension lines, and means extending said weights as said apex moves axially along said center line.

8. A recovery system as in claim 7, and means utilizing the potential energy of such descending load and moving said apex oppositely axially along said center line and retracting said weights toward said blades.

9. A recovery system as in claim 7, and means establishing axial motion between the load and the rotor retracting said suspension lines and said weights.

References Cited in the file of this patent

UNITED STATES PATENTS

| | | |
|---|---|---|
| 2,076,090 | Myers | Apr. 6, 1937 |
| 3,065,799 | McCarty | Nov. 27, 1962 |

FOREIGN PATENTS

| | | |
|---|---|---|
| 527,443 | Great Britain | Oct. 9, 1940 |
| 608,681 | Great Britain | Sept. 20, 1948 |
| 645,271 | Great Britain | Oct. 25, 1950 |